US012795287B2

(12) United States Patent
Tang et al.

(10) Patent No.: US 12,795,287 B2
(45) Date of Patent: Nov. 10, 2026

(54) WIRELESS HEADPHONE SET AND CONTROL METHOD FOR WIRELESS HEADPHONE SET

(71) Applicant: Shenzhen Shokz Co., Ltd., Shenzhen (CN)

(72) Inventors: Dongshan Tang, Shenzhen (CN); Gan Lai, Shenzhen (CN); Liang Wang, Shenzhen (CN)

(73) Assignee: Shenzhen Shokz Co., Ltd., Shenzhen (CN)

(*) Notice: Subject to any disclaimer, the term of this patent is extended or adjusted under 35 U.S.C. 154(b) by 128 days.

(21) Appl. No.: 18/885,717

(22) Filed: Sep. 15, 2024

(65) Prior Publication Data

US 2025/0016489 A1 Jan. 9, 2025

Related U.S. Application Data

(63) Continuation of application No. PCT/CN2022/128861, filed on Nov. 1, 2022.

(51) Int. Cl.
*H04R 1/10* (2006.01)

(52) U.S. Cl.
CPC ....... *H04R 1/1041* (2013.01); *H04R 2420/07* (2013.01); *H04R 2460/07* (2013.01)

(58) Field of Classification Search
CPC ......... H04W 4/80; H04R 1/10; H04R 1/1041; H04R 1/1008; H04R 1/1016; H04R 2420/07; H04R 2460/07; H04R 5/033
See application file for complete search history.

(56) References Cited

U.S. PATENT DOCUMENTS

| | | | | |
|---|---|---|---|---|
| 10,536,191 | B1 * | 1/2020 | De Laurentiis | H04B 5/0006 |
| 11,800,312 | B2 * | 10/2023 | Tong et al. | H04S 7/304 |
| 2018/0279038 | A1 | 9/2018 | Boesen | |
| 2020/0107103 | A1 * | 4/2020 | Chen et al. | |
| 2022/0353666 | A1 * | 11/2022 | Solano et al. | H04W 8/00 |

FOREIGN PATENT DOCUMENTS

| | | | | |
|---|---|---|---|---|
| CN | 108882210 A | | 11/2018 | |
| CN | 10888221 | * | 10/2021 | H04W 4/80 |
| CN | 113949959 A | | 1/2022 | |
| CN | 109561414 | * | 10/2022 | H04W 4/80 |

OTHER PUBLICATIONS

International Search Report of PCT/CN2022/128861 (Mar. 2, 2023).

* cited by examiner

*Primary Examiner* — Jason Chan
(74) *Attorney, Agent, or Firm* — Fideli Law PLLC; Qiang Li

(57) ABSTRACT

A wireless headphone set and a control method for a wireless headphone set are provided. The wireless headphone set includes: a speaker component, a wireless module, a sensor component, and a control module. The control module receives a target trigger signal from the sensor component, and performs the following operations based on the target trigger signal: instructing the wireless module to establish a first pairing connection with a second headphone, instructing the wireless module to pair with a target device and establish a second pairing connection to receive audio data, sending the audio data to the second headphone, and sending the audio data to the speaker component to convert the audio data into an audio. In the process of using the wireless headphone set, a headphone case is not required, so that operation steps of the user are simplified, and user experience is improved.

16 Claims, 6 Drawing Sheets

WIRELESS HEADPHONE SET AND CONTROL METHOD FOR WIRELESS HEADPHONE SET

RELATED APPLICATIONS

This application is a continuation application of PCT application No. PCT/CN2022/128861, filed on Nov. 1, 2022, and the content of which is incorporated herein by reference in its entirety.

TECHNICAL FIELD

This disclosure relates to the field of wireless headphone technologies, and in particular, to a wireless headphone set and a control method for a wireless headphone set.

BACKGROUND

Wireless headphones are becoming increasingly popular among users due to their convenience of use. After a wireless headphone is connected with an audio output device (for example, a mobile phone or a sound box), a user may use the wireless headphone to listen audio data (for example, music) output by the audio output device.

In the related art, a process of using the wireless headphone needs to rely on a headphone holder. For example, when a user needs to trigger the wireless headphone to pair with the audio output device, the user needs to put the wireless headphone into the headphone case, open a cover of the headphone case, and press and hold a button on the headphone case, so that the headphone case sends a control instruction to the wireless headphone, to control the wireless headphone to enter a pairing state. After finding the wireless headphone, the audio output device performs pairing with the wireless headphone and establishes a pairing connection.

However, based on the foregoing manner, in the process of using the wireless headphone, the user needs to control the wireless headphone by using the headphone case. Therefore, in the process of using the wireless headphone by the user, operation steps are relatively cumbersome and user experience is poor.

BRIEF SUMMARY

This disclosure provides a wireless headphone set and a control method for a wireless headphone set, to simplify operation steps of using a wireless headphone set by the user and improve user experience.

According to a first aspect, this disclosure provides a wireless headphone set, comprising: a first headphone and a second headphone, where first headphone is pairable and the second headphone is pairable, and the first headphone includes: a speaker component, a wireless module, configured to establish a first pairing connection with the second headphone, and establish a second pairing connection with a target device, a sensor component, configured to send a target trigger signal; and a control module in communication with the speaker component, the wireless module and the sensor component, and configured to control the wireless headphone set to receive audio data from the target device in a target mode and play the audio data, where the target mode includes a binaural mode, and in the binaural mode, the control module receives the target trigger signal from the sensor component, and based on the target trigger signal: instruct the wireless module to establish the first pairing connection with the second headphone, instruct the wireless module to pair with the target device and establish the second pairing connection to receive the audio data, and send the audio data to the second headphone, and send the audio data to the speaker component to convert the audio data into an audio.

According to a second aspect, this disclosure further provides a control method for a wireless headphone set, where the wireless headphone set includes a first headphone and a second headphone, the first headphone is pairable, the second headphone is pairable, the first headphone includes a speaker component, a wireless module, a sensor component, and a control module, a working mode of the wireless headphone set includes a binaural mode, and the method is applicable to the first headphone, and in the binaural mode, the method comprises: by the control module, receiving a target trigger signal from the sensor component; and based on the target trigger signal, instructing the wireless module to establish a first pairing connection with the second headphone, instructing the wireless module to pair with a target device and establish a second pairing connection to receive audio data, and sending the audio data to the second headphone, and sending the audio data to the speaker component to convert the audio data into an audio.

It can be learned from the foregoing technical solutions that for the wireless headphone set and the control method for a wireless headphone set provided in this disclosure, the wireless headphone set includes a first headphone and a second headphone that can be paired, where the first headphone includes: a sensor component, a wireless module, and a speaker component. The sensor component is configured to send a target trigger signal; and based on the target trigger signal, the first headphone establishes a first pairing connection with the second headphone via the wireless module, pairs with a target device and establishes a second pairing connection via the wireless module to receive audio data, and sends the audio data to the second headphone, and plays audio corresponding to the audio data with the speaker component. It can be learned that in the entire process of using the wireless headphone set, a headphone holder is not required, so that operation steps of the user are simplified, and user experience is improved. In addition, a button does not need to be provided on the headphone case, thereby reducing complexity of a hardware structure of the headphone case. Furthermore, because a control process of the wireless headphone set is no longer dependent on the headphone case, the control process is simplified, and a success rate and stability of a pairing connection of the wireless headphone set can be improved.

Other functions of the wireless headphone set and the control method for a wireless headphone set provided in this disclosure are listed in the following descriptions. Creative aspects of the wireless headphone set and the control method for a wireless headphone set provided in this disclosure may be fully explained by practice or by using the method, apparatus, and combinations described in the following detailed examples.

BRIEF DESCRIPTION OF THE DRAWINGS

To describe the technical solutions in the embodiments of this disclosure more clearly, the following briefly describes the accompanying drawings for the embodiments. Apparently, the accompanying drawings in the following description show merely some exemplary embodiments of this disclosure, and a person of ordinary skill in the art may derive other drawings from these accompanying drawings without creative efforts.

DETAILED DESCRIPTION

Figure 1:
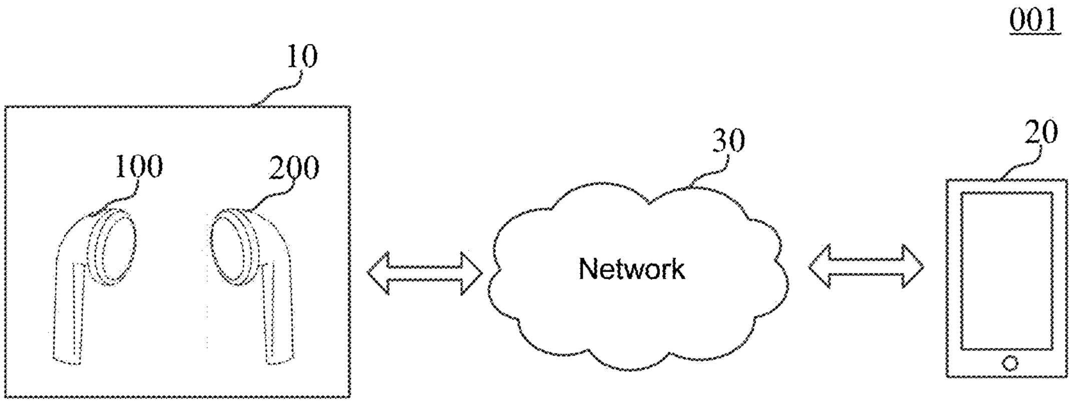
FIG. 1 is a schematic diagram of an application scenario of a wireless headphone set according to some exemplary embodiments of this disclosure.

The following description provides specific application scenarios and requirements of this disclosure, with the purpose of enabling a person skilled in the art to make and use the content in this disclosure. For a person skilled in the art, various partial modifications to the disclosed embodiments are obvious, and without departing from the spirit and scope of this disclosure, the general principles defined herein can be applied to other embodiments and application. Therefore, the specification is not limited to the embodiments, but is the consistent with the widest scope of the claims.

The terms used herein are merely intended to describe specific examples or embodiments, rather than to limit the present disclosure. For example, unless expressly stated otherwise, the singular forms "a", "an" and "this" used herein may also include plural forms. In this disclosure, the terms "include" and/or "comprise" refer to the existence of an associated integer, step, operation, element, component and/or group, without excluding the existence of one or more other features, integers, steps, operations, elements, components and/or groups. In other words, other features, integers, steps, operations, elements, components and/or groups may be added to the system/method.

In consideration of the following description, in the present disclosure, these and other features, the operation and function of related elements of the structure, as well as the economic efficiency of the combination and manufacturing of components can be significantly improved. With reference to the drawings, all of these form part of the present disclosure. However, it should be understood that the drawings are merely intended for illustration and description purposes, rather than to limit the scope of the present disclosure. It should be understood that the accompanying drawings are not drawn to scale.

The flowchart used in this disclosure illustrates the operations implemented by the system according to some exemplary embodiments in this disclosure. It should be clearly understood that the operations of the flowchart may be implemented in different sequences. Instead, operations may be implemented in reverse sequence or simultaneously. In addition, one or more other operations may be added to the flowchart. One or more operations may be removed from the flowchart.

For ease of description, the following terms are explained in this disclosure:

Bluetooth is an open global standard for wireless data and voice communication, and is a special near field wireless technology for establishing a communication environment for fixed and mobile devices based on a low-cost near field wireless connection.

Pairing is an information registration method for establishing a connection between wireless devices. Device information is registered between different wireless devices, so that a connection maybe established between the different wireless devices. A pairing process may be understood as a process of interchanging device information between wireless devices. Taking a wireless headphone set and a mobile phone as an example, in a process of pairing the wireless headphone set and the mobile phone, the wireless headphone set sends device information of the wireless headphone set to the mobile phone, so that the mobile phone stores the device information of the wireless headphone set, and the mobile phone also sends device information of the mobile phone, so that the wireless headphone set stores the device information of the mobile phone. After pairing is completed, a wireless connection may be easily established as the mobile phone and the wireless headphone set store the device information of each other. It can be understood that after the pairing process is performed once, both the mobile phone and the wireless headphone set store the device information of each other. Therefore, when a wireless connection is subsequently established, the pairing process does not need to be repeatedly performed. That is, the pairing process usually needs to be performed only once. Certainly, in some scenarios, if the device information stored in the wireless headphone set or the mobile phone is deleted, the pairing process needs to be performed again before a wireless connection is re-established.

A pairing connection is a connection established between two paired wireless devices. Taking a wireless headphone set and a mobile phone as an example, headphone that the wireless headphone set includes a first headphone and a second headphone, if the wireless headphone set works in a binaural mode, pairing is required between the first headphone and the second headphone, and a pairing connection needs to be established. The first headphone/the second headphone also needs to be paired with the mobile phone in order to establish a pairing connection. In this disclosure, for ease of description, a pairing connection between the first headphone and the second headphone is referred to as a first pairing connection, and a pairing connection between the first headphone/the second headphone and the mobile phone is referred to as a second pairing connection.

Before specific embodiments of this disclosure are described, the following describes an application scenario of this disclosure.

This disclosure relates to a use scenario of a wireless headphone set. An exemplary use scenario is as follows: The wireless headphone set is paired with an audio output device (for example, a mobile phone or a sound box) and a second pairing connection is established, and audio output from the audio output device is played by using the wireless headphone set. It should be noted that a use scenario of a wireless headphone in this disclosure mainly includes a scenario in which the wireless headphone set establishes a second pairing connection with a target device for the first time. It should be understood that the "establishing a second pairing connection for the first time" herein means establishing the second pairing connection in the case where the wireless headphone set is not paired with the target device. In this scenario, the wireless headphone set needs to pair with the target device before establishing the second pairing connection. In a scenario in which it is not the first time for establishing the second pairing connection between the wireless headphone set and the target device, since the wireless headphone set and the target device have paired with each other, a pairing procedure between the wireless headphone set and the target device no longer needs to be triggered, and the wireless headphone set and the target device may directly establish the second pairing connection based on device information stored in the previous pairing process.

FIG. 1 is a schematic diagram of an application scenario of a wireless headphone set according to some exemplary embodiments of this disclosure. As shown in FIG. 1, an application scenario 001 may include a wireless headphone set 10, a target device 20, and a network 30.

The wireless headphone set 10 may include a first headphone 100 and a second headphone 200 that can be paired. In some exemplary embodiments, the first headphone 100 may be a left headphone, and the second headphone 200 may be a right headphone. In some exemplary embodiments, the first headphone 100 may be a right headphone, and the second headphone 200 may be a left headphone. The first headphone 100 and the second headphone 200 may be separately used, or may be paired for use. When the first headphone 100 or the second headphone 200 is used separately, the wireless headphone set works in a monaural mode. When the first headphone 100 and the second headphone 200 are paired for use, the wireless headphone set works in a binaural mode. The wireless headphone set 10 is communicatively connected with the target device 20, and may receive data of to-be-played audio from the target device 20, and play the foregoing audio. In some exemplary embodiments, the control method for a wireless headphone set described in this disclosure may be performed by the first headphone 100, or may be performed by the second headphone 200. In some exemplary embodiments, the first headphone 100 or the second headphone 200 may store data or an instruction for performing the control method for a wireless headphone set described in this disclosure, and may execute or be configured to execute the data or the instruction. In some exemplary embodiments, the first headphone 100 or the second headphone 200 may include a hardware device with a data information processing function and a program necessary to drive the hardware device to work. The control method for a wireless headphone set is described later in this disclosure.

The target device 20 may be an electronic device with an audio output function. The target device 20 may also be referred to as an audio output device. In some exemplary embodiments, the target device 20 may include a mobile device, a tablet computer, a laptop computer, a built-in device in a motor vehicle, or the like, or any combination thereof. In some exemplary embodiments, the mobile device may include a smart home device, an intelligent mobile device, a virtual reality device, an augmented reality device or the like, or any combination thereof. In some exemplary embodiments, the smart home device may include a smart TV, a desktop computer, a smart sound box or the like, or any combination thereof. In some exemplary embodiments, the smart mobile device may include a smartphone, a personal digital assistance, a game device, a navigation device or the like, or any combination thereof. In some exemplary embodiments, the virtual reality device or the augmented reality device may include a virtual reality helmet, virtual reality glasses, a virtual reality handle, an augmented reality helmet, augmented reality glasses, an augmented reality handle, or the like, or any combination thereof. For example, the virtual reality device or the augmented reality device may include Google glasses, a head-mounted display, VR, and the like. In some exemplary embodiments, the built-in device in the motor vehicle may include an on-board computer, an on-board television, and the like. In some exemplary embodiments, the target device 20 may include an audio collecting device, configured to collect audio data in a target space, so as to obtain data of to-be-played audio. In some exemplary embodiments, the target device 20 may receive the data of the to-be-played audio from another device.

In some exemplary embodiments, one or more application programs (APPs) may be installed in the target device 20. The APPs may allow a user to interact with the outside world and an interface therefor. The APPs include, but are not limited to, a web browser type APP program, a search type APP program, a chat type APP program, a shopping type APP program, a video type APP program, a financial type APP program, an instant messaging tool, a mailbox client, social platform software, and the like. In some exemplary embodiments, a target APP may be installed in the target device 20. The target APP can generate data of to-be-played audio, or the target APP can receive data of to-be-played audio from another device.

The network 30 is configured to provide a medium for a communication connection between the wireless headphone set 10 and the target device 20. The network 30 may facilitate exchange of information or data. As shown in FIG. 1, the wireless headphone set 10 and the target device 20 may be connected with the network 30, and transmit information or data to each other by using the network 30. In some exemplary embodiments, the network 30 may be any type of wireless network. For example, the network 30 may include a telecommunications network, an intranet, an Internet, a local area network (LAN), a wide area network (WAN), a wireless local area network (WLAN), a metropolitan area network (MAN), a public telephone switching network (PSTN), a Bluetooth network, a ZigBee network, a near field communication (NFC) network, or a similar network. In some exemplary embodiments, the network 30 may be a Bluetooth network. In this case, the wireless headphone set 10 may be a headphone set that supports a Bluetooth protocol, and the target device 20 may be an audio output device that supports the Bluetooth protocol. The first headphone 100 communicates with the second headphone 200 based on the Bluetooth protocol, and the first headphone 100/the second headphone 200 communicates with the target device 20 based on the Bluetooth protocol.

It should be understood that the wireless headphone set 10, the target device 20 and the network 30 in FIG. 1 are merely some examples. Depending on implementation needs, there may be any number of wireless headphone sets 10, target devices 20, and networks 30.

Figure 2:
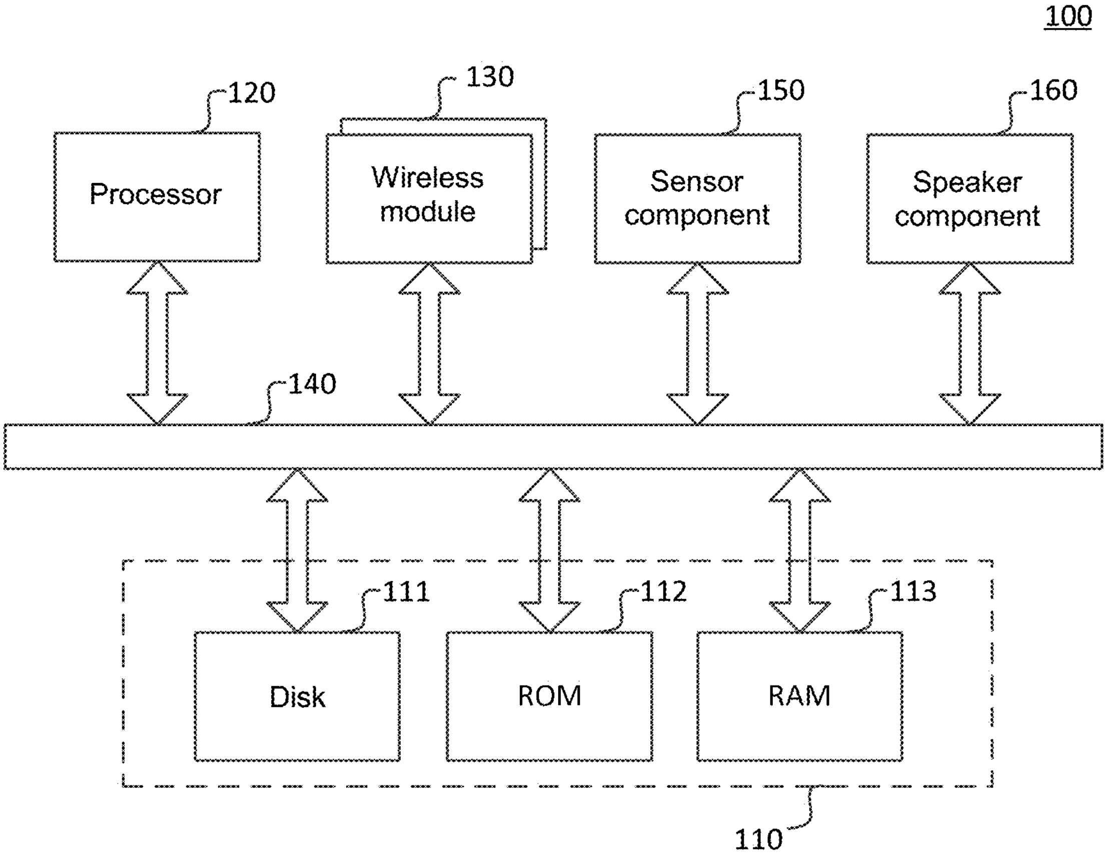
FIG. 2 is a structural diagram of hardware of a first headphone according to some exemplary embodiments of this disclosure.

FIG. 2 is a structural diagram of hardware of a first headphone according to some exemplary embodiments of this disclosure. The first headphone 100 may be a left headphone, or may be a right headphone. As shown in FIG. 2, the first headphone 100 may include a speaker component 160, a wireless module 130, a sensor component 150, and a control module. The control module may include at least one storage medium 110 and at least one processor 120.

For demonstration purposes only, the control module includes the at least one storage medium 110 and the at least one processor 120. A person of ordinary skill in the art may understand that the control module may also include another hardware circuit structure, which is not limited in this disclosure, provided that the functions mentioned in this disclosure can be met without departing from the principles of this disclosure.

In some exemplary embodiments, the first headphone 100 may further include an internal communications bus 140. The internal communications bus 140 may be connected with different system components. For example, the at least one storage medium 110, the at least one processing processor 120, the speaker component 160, the wireless module 130, and the sensor component 150 may all be connected with the internal communications bus 140, to implement interconnection between different system components.

The wireless module 130 is used for communication between the first headphone 100 and the outside world (an external device). In some exemplary embodiments, the wireless module 130 is configured to establish a first pairing connection with the second headphone 200. That is, the wireless module 130 may be used for communication between the first headphone 100 and the second headphone 200. For example, the first headphone 100 may send audio data or a signal to the second headphone 200 by using the wireless module 130, or the first headphone 100 may receive audio data or a signal from the second headphone by using the wireless module 130. In some exemplary embodiments, the wireless module 130 may be further configured to establish a second pairing connection with the target device 20. That is, the wireless module 130 may be used for communication between the first headphone 100 and the target device 20. For example, the first headphone may send audio data or a signal to the target device 20 by using the wireless module 130, or the first headphone 100 may receive audio data or a signal from the target device 20 by using the wireless module 130. In some exemplary embodiments, when the wireless headphone set is a Bluetooth headphone set, the foregoing wireless module may be a Bluetooth module based on the Bluetooth protocol.

The speaker component 160 is configured to convert the audio data into audio and play the audio. For example, after receiving the audio data from the second headphone 200 or the target device 20, the first headphone 100 may play the audio by using the speaker component 160. In a state in which the user is wearing the first headphone 100, the speaker component 160 may be near an ear canal of the user, so that the user can hear the audio when the speaker component 160 plays the audio. The speaker component 160 may be a bone conductive speaker and/or an air conductive speaker. When the speaker component 160 is a bone conductive speaker, a vibration signal generated by the speaker component 160 is transmitted to an auditory nerve of the user through the skin and bones of the user, so that the user hears a sound; when the speaker component 160 is an air conductive speaker, a sound signal generated by the speaker component 160 is transmitted to an auditory nerve of the user through air and an eardrum, so that the user hears a sound; or the speaker component 160 may include both a bone conductive speaker and an air conductive speaker, and the speaker component 160 simultaneously generates a vibration signal and an air conductive sound signal.

The sensor component 150 is configured to send a target trigger signal. In some exemplary embodiments, the sensor component 150 may collect sensor data and send the target trigger signal when it is detected that the sensor data meets a certain condition. The sensor component 150 may include one or more sensors. In some exemplary embodiments, when the sensor component 150 includes a plurality of sensors, the plurality of sensors may be located at different parts of the first headphone 100, and may be configured to collect different sensor data and send different trigger signals.

Figure 3:
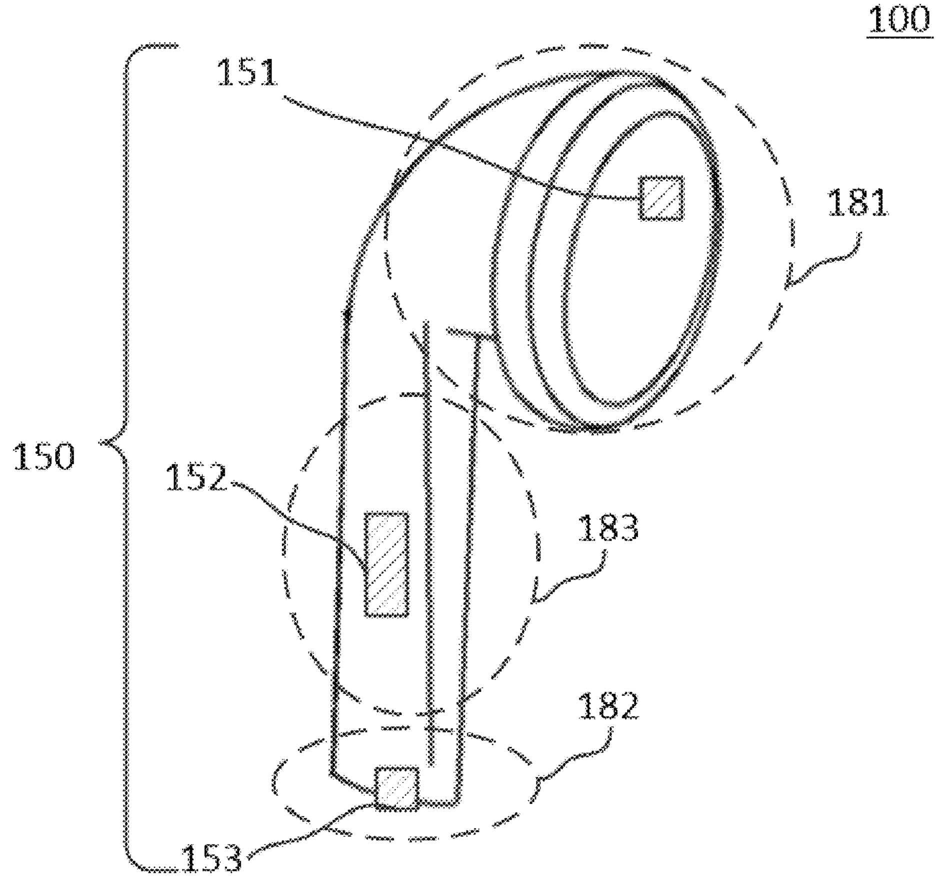
FIG. 3 is a schematic diagram of a first headphone and a sensor component thereof according to some exemplary embodiments of this disclosure.

FIG. 3 is a schematic diagram of a first headphone and a sensor component thereof according to some exemplary embodiments of this disclosure. As shown in FIG. 3, a body of the first headphone 100 may include an in-ear portion 181, a charging portion 182, and a connection portion 183. During charging, the charging portion 182 is in contact with a headphone case, and a charging contact is generally disposed in the charging portion 182. The in-ear portion 181 enters the ear canal of the user during wearing, and the in-ear portion 181 may also be referred to as an earplug portion. The connection portion 183 is located between the in-ear portion 181 and the charging portion 182, and is configured to connect the in-ear portion 181 and the charging portion 182. When the user takes the first headphone, the connection portion 183 thereof is usually held by a hand. The connection portion 183 may also be referred to as a handle portion.

In some exemplary embodiments, the sensor component 150 may include at least one of an out-of-case detection sensor 153, a touch sensor 152, and an in-ear detection sensor 151.

The out-of-case detection sensor 153 may be disposed in the charging portion 182 of the first headphone 100, and configured to send a target trigger signal when it is detected that the charging portion 182 is disconnected from the headphone case. For example, when the user takes the first headphone 100 out of the headphone case, the out-of-case detection sensor 153 detects that the charging portion 182 is disconnected from the headphone case, and therefore sends the target trigger signal. In this case, the target trigger signal is triggered by the out-of-case detection sensor upon detecting that the first headphone 100 enters an out-of-case state. The first headphone is activated in the out-of-case state. For example, the first headphone may establish a connection with the second headphone based on a received external signal and/or detecting an in-ear state. Details are described later in this disclosure.

The touch sensor 152 may be disposed in the connection portion 183 of the first headphone 100, and configured to send the target trigger signal when a preset touch operation of the user is detected. For example, when the user inputs the preset touch operation on the touch sensor 152, the touch sensor 152 detects the preset touch operation and therefore sends the target trigger signal. In this case, the target trigger signal is triggered by the touch sensor 152 detecting the preset touch operation. The touch sensor 152 may be a touch-based sensor, or may be a button-based sensor. The preset touch operation includes, but is not limited to, a preset touch duration, a preset number of times of touch, a preset sliding track, and the like.

The in-ear detection sensor 151 may be disposed in the in-ear portion 181 of the first headphone 100, and configured to send the target trigger signal when it is detected that the in-ear portion 181 enters the ear canal of a user. For example, when a user wears the first headphone 100, and the in-ear detection sensor 151 detects that the in-ear portion 181 enters the ear canal of the user and therefore sends the target trigger signal. In this case, the target trigger signal is triggered when the first headphone enters a wearing state. The in-ear detection sensor 151 includes, but is not limited to, at least one of an optical-based sensor, a capacitive-based sensor, and an infrared-based proximity sensor.

The storage medium 110 may include a data storage apparatus. The data storage apparatus may be a non-transitory storage medium, or may be a transitory storage medium. For example, the data storage apparatus may include one or more of a disk 111, a read-only storage medium (ROM) 112, or a random access storage medium (RAM) 113. The storage medium 110 further includes at least one set of instructions stored in the data storage apparatus. The at least one set of instructions includes an instruction, the instruction may be a computer program code, and the computer program code may include a program, a routine, an object, a component, a data structure, a process, a module, and the like for performing the control method for a wireless headphone set provided in this disclosure.

The at least one processor 120 may be communicatively connected with the at least one storage medium 110 via the internal communications bus 140. The at least one processor 120 is configured to execute the foregoing at least one set of instructions. When the wireless headphone set 10 is in operation, the at least one processor 120 reads the at least one set of instructions and performs the control method for a wireless headphone set provided in this disclosure according to an instruction(s) of the at least one set of instructions. The processor 120 may perform all steps included in the control method for a wireless headphone set. The processor 120 may be one or more processors. In some exemplary embodiments, the processor 120 may include one or more hardware processors, such as a microcontroller, a microprocessor, a reduced instruction set computer (RISC), an application specific integrated circuit (ASIC), an application specific instruction set processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, or any combination thereof. For illustration only, a case that the first headphone 100 includes one processor 120 is illustrated in FIG. 2. However, it should be noted that the first headphone 100 in this disclosure may include a plurality of processors 120. Therefore, operations and/or method steps disclosed in this disclosure may be performed by one processor as described in this disclosure, or may be performed jointly by a plurality of processors. For example, if the processor 120 of the first headphone 100 performs step A and step B in this disclosure, it should be understood that step A and step B may be performed jointly or separately by two different processors 120 (for example, the first processor performs step A, the second processor performs step B, or the first processor and the second processor jointly perform step A and step B).

The at least one set of instructions stored in the storage medium 110 is used to control the wireless headphone set 10 to receive audio data from the target device 20 in a target mode and play audio. The target mode includes a binaural mode and a monaural mode.

In the monaural mode, only one headphone in the wireless headphone set 10 is in a working state. In an example in which the first headphone 100 is in a working state, the first headphone 100 is paired with the target device 20 and establishes the second pairing connection, and the second headphone 200 neither performs pairing with nor establishes the second pairing connection with the target device 20. In an example in which the second headphone 200 is in a working state, the second headphone 200 is paired with the target device 20 and establishes the second pairing connection, and the first headphone 100 neither performs pairing with nor establishes the second pairing connection with the target device 20. In the monaural mode, the first pairing connection does not need to be established between the first headphone 100 and the second headphone 200. In an example in which the first headphone 100 is in a working state, a working process of the first headphone 100 includes: the first headphone 100 is paired with the target device 20 and establishes the second pairing connection, receives audio data from the target device 20 by using the second pairing connection, converts the audio data into an audio by using the speaker component 160, and plays the audio. In this process, there is no data interaction between the second headphone 200 and the target device 20, and there is no data interaction between the second headphone 200 and the first headphone 100.

In the binaural mode, two headphones in the wireless headphone set 10 are in a working state. In the binaural mode, the first pairing connection is established between the first headphone 100 and the second headphone 200, both the first headphone 100 and the second headphone 200 need to be paired with the target device 20, and one of the headphones (the first headphone 100 or the second headphone 200) establishes the second pairing connection with the target device 20. A headphone that establishes the second pairing connection with the target device 20 is referred to as a primary headphone, and the other headphone is referred to as a secondary headphone. In an example in which the first headphone 100 is a primary headphone, the second pairing connection is established between the first headphone 100 and the target device 20, and the second pairing connection does not need to be established between the second headphone 200 and the target device 20. A working process of the two headphones is as follows: The first headphone 100 establishes the first pairing connection with the second headphone 200, the first headphone 100 and the second headphone 200 are paired with the target device 20, and the first headphone 100 establishes the second pairing connection with the target device 20. The first headphone 100 receives the audio data from the target device 20 via the second pairing connection, and sends the audio data to the second headphone 200 via the first pairing connection. In this way, both the first headphone 100 and the second headphone convert the audio data into an audio with the speaker component 160 thereof, and then play the audio, thereby implementing a playback effect of a dual-channel stereo. In this process, there is no direct data interaction between the second headphone 200 and the target device 20, but indirect data interaction is performed by using the first headphone 100.

The following separately describes the control method for a wireless headphone set in the binaural mode and monaural mode.

Figure 4:
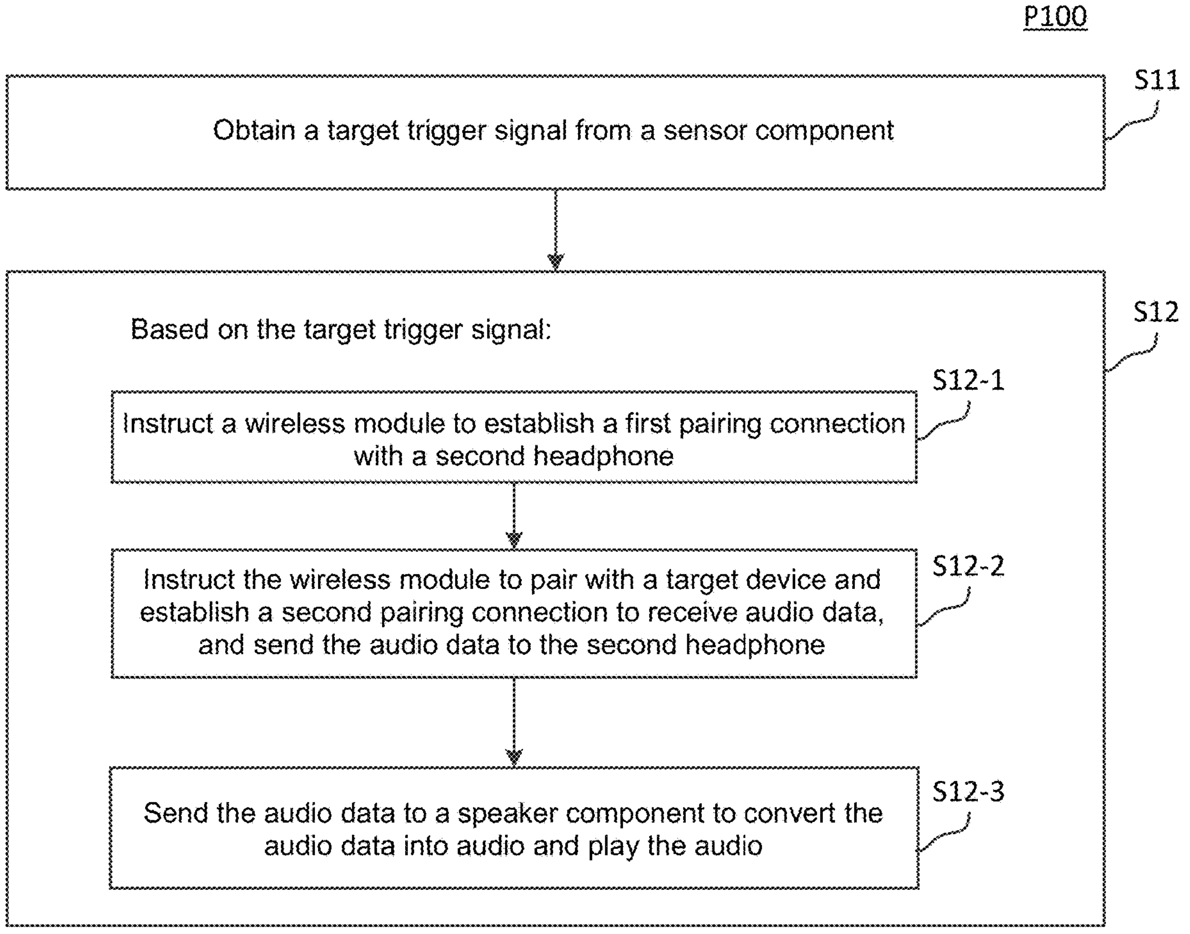
FIG. 4 is a schematic flowchart of a control method for a wireless headphone set in a binaural mode according to some exemplary embodiments of this disclosure.

FIG. 4 is a schematic flowchart of a control method for a wireless headphone set in a binaural mode according to some exemplary embodiments of this disclosure. The first headphone 100 may perform a control method P100 for a wireless headphone set in this disclosure. Specifically, the control module in the first headphone 100 may perform the control method P100 for a wireless headphone set in this disclosure. For example, the processor 120 in the first headphone 100 may read an instruction set stored in a local storage medium, and then execute the control method P100 for a wireless headphone set described in this disclosure according to an instruction of the instruction set. As shown in FIG. 4, the method P100 may include the following steps:

S11. Obtain a target trigger signal from a sensor component.

The control module may receive the target trigger signal from the sensor component 150.

In some exemplary embodiments, the target trigger signal may include a trigger signal. For example, the target trigger signal may be a signal sent by the out-of-case detection sensor 153. In this case, the target trigger signal is triggered when the first headphone 100 enters an out-of-case state. In another example, the target trigger signal may be a signal sent by the touch sensor 152. In this case, the target trigger signal is triggered by the touch sensor 152 detecting the preset touch operation. In another example, the target trigger signal may be alternatively a signal sent by the in-ear detection sensor 151. In this case, the target trigger signal is triggered when the first headphone 100 enters a wearing state.

In some exemplary embodiments, the target trigger signal may include a plurality of trigger signals. For example, the target trigger signal may include a first trigger signal sent by the out-of-case detection sensor 153 and a second trigger signal sent by the touch sensor 152. In another example, the target trigger signal may include a first trigger signal sent by the out-of-case detection sensor 153 and a third trigger signal sent by the in-ear detection sensor 151. In another example, the target trigger signal may include a second trigger signal sent by the touch sensor 152 and a third trigger signal sent by the in-ear detection sensor 151. In the foregoing example, the first trigger signal is triggered when the first headphone 100 enters an out-of-case state, the second trigger signal is triggered by the touch sensor 152 detecting a preset touch operation, and the third trigger signal is triggered when the first headphone 100 enters a wearing state.

S12. Perform S12-1 to S12-3 based on the target trigger signal.

S12-1. Instruct a wireless module to establish a first pairing connection with a second headphone.

Specifically, the control module may instruct the wireless module 130 to establish the first pairing connection with the second headphone.

S12-2. Instruct the wireless module to pair with a target device and establish a second pairing connection to receive audio data, and send the audio data to the second headphone.

Specifically, the control module may instruct the wireless module 130 to pair with the target device 20, and establish the second pairing connection with the target device 20 after the pairing succeeds, to receive the audio data from the target device 20 via the second pairing connection. After receiving the audio data from the target device 20, the control module may further send the audio data to the second headphone 200.

S12-3. Send the audio data to a speaker component to convert the audio data into an audio and play the audio.

Specifically, the control module may send the audio data to the speaker component 160, so that the speaker component 160 plays the audio corresponding to the audio data.

It can be learned that the foregoing S12-1 to S12-3 are respectively corresponding to three processing steps in the process of using the wireless headphone set. S12-1 corresponds to the establishment step of the first pairing connection. S12-2 corresponds to the establishment step of the second pairing connection. In this step, the first headphone 100 is first paired with the target device 20, and then establishes the second pairing connection with the target device 20. S12-3 corresponds to the playback step of the audio data.

In some exemplary embodiments, when the target trigger signal is a single signal, the foregoing S12-1 to S12-3 may be triggered by using the target trigger signal. The following provides several examples for further description.

For example, when a user needs to use the wireless headphone set, the first headphone 100 is taken out of the headphone case, and the out-of-case detection sensor 153 sends the target trigger signal upon detecting that the charging portion 182 is disconnected from the headphone case. The processor 120 receives the target trigger signal from the out-of-case detection sensor 153, and performs the foregoing S12-1 to S12-3 based on the target trigger signal.

For example, when the user needs to use the wireless headphone set, a preset touch operation is input on the touch sensor 152 of the connection portion 183 of the first headphone 100, and the touch sensor 152 detects the preset touch operation and sends the target trigger signal. The processor 120 receives the target trigger signal from the touch sensor 152, and performs the foregoing S12-1 to S12-3 based on the target trigger signal.

For example, when the user needs to use the wireless headphone set, the first headphone 100 is worn on the ear, and the in-ear detection sensor 151 detects that the in-ear portion 181 enters the ear canal of the user, and sends the target trigger signal. The processor 120 receives the target trigger signal from the in-ear detection sensor 151, and performs the foregoing S12-1 to S12-3 based on the target trigger signal.

In the above examples, in the entire process of using the wireless headphone, the user only needs to take out the first headphone 100 from the headphone case, or input the preset touch operation on the touch sensor 152, or wear the first headphone 100 on the ear, in order to trigger the processing steps of the foregoing S12-1 to S12-3. In the entire process of using the wireless headphone, a headphone holder is not required, so that operation steps of the user are simplified, and user experience is improved. In addition, a button does not need to be disposed on the headphone case, thereby reducing complexity of a hardware structure of the headphone case. Furthermore, because a control process of the wireless headphone set is no longer dependent on the headphone case, the control process is simplified, and a success rate and stability of a pairing connection of the wireless headphone set can also be improved.

In some exemplary embodiments, the target trigger signal may include at least one of the first trigger signal, the second trigger signal, or the third trigger signal. The first trigger signal is triggered when the first headphone enters an out-of-case state, the second trigger signal is triggered by the sensor component 150 (the touch sensor 152) detecting the preset touch operation, and the third trigger signal is triggered when the first headphone enters a wearing state. In this case, the processing steps of the foregoing S12-1 to S12-3 may be triggered by different trigger signals. The following provides several examples for description.

In some exemplary embodiments, the target trigger signal includes the first trigger signal and the second trigger signal. When the user needs to use the wireless headphone set, the first headphone 100 is taken out of the headphone case, and the out-of-case detection sensor 153 sends the first trigger signal upon detecting that the charging portion 182 is disconnected from the headphone case. The processor 120 receives the first trigger signal from the out-of-case detection sensor 153, and performs the foregoing S12-1 based on the first trigger signal. Then the user inputs the preset touch operation on the touch sensor 152 of the connection portion 183 of the first headphone 100, and the touch sensor 152 detects the preset touch operation and sends the second trigger signal. The processor 120 receives the second trigger signal from the touch sensor 152, and performs the foregoing S12-2 and S12-3 based on the second trigger signal.

Alternatively, when the user needs to use the wireless headphone set, the first headphone 100 is taken out of the headphone case, and the out-of-case detection sensor 153 sends the first trigger signal upon detecting that the charging portion 182 is disconnected from the headphone case. The processor 120 receives the first trigger signal from the out-of-case detection sensor 153, and performs the foregoing S12-1 and S12-2 based on the first trigger signal. Then the user inputs the preset touch operation on the touch sensor 152 of the connection portion 183 of the first headphone 100, and the touch sensor 152 detects the preset touch operation and sends the second trigger signal. The processor 120 receives the second trigger signal from the touch sensor 152, and performs the foregoing S12-3 based on the second trigger signal.

In some exemplary embodiments, the target trigger signal includes the first trigger signal and the third trigger signal. When the user needs to use the wireless headphone set, the first headphone 100 is taken out of the headphone case, and the out-of-case detection sensor 153 sends the first trigger signal upon detecting that the charging portion 182 is disconnected from the headphone case. The processor 120 receives the first trigger signal from the out-of-case detection sensor 153, and performs the foregoing S12-1 and S12-2 based on the first trigger signal. Then the user wears the first headphone 100 on the ear, and the in-ear detection sensor 151 detects that the in-ear portion 181 enters the ear canal of the user, and sends the third trigger signal. The processor 120 receives the third trigger signal from the in-ear detection sensor 151, and performs the foregoing S12-3 based on the third trigger signal.

Alternatively, when the user needs to use the wireless headphone set, the first headphone 100 is taken out of the headphone case, and the out-of-case detection sensor 153 sends the first trigger signal upon detecting that the charging portion 182 is disconnected from the headphone case. The processor 120 receives the first trigger signal from the out-of-case detection sensor 153, and performs the foregoing S12-1 based on the first trigger signal. Then the user wears the first headphone 100 on the ear, and the in-ear detection sensor 151 detects that the in-ear portion 181 enters the ear canal of the user, and sends the third trigger signal. The processor 120 receives the third trigger signal from the in-ear detection sensor 151, and performs the foregoing S12-2 and S12-3 based on the third trigger signal.

In some exemplary embodiments, the target trigger signal includes the second trigger signal and the third trigger signal. When the user needs to use wireless headphone set, the user inputs the preset touch operation on the touch sensor 152 of the connection portion 183 of the first headphone 100, and the touch sensor 152 detects the preset touch operation and sends the second trigger signal. The processor 120 receives the second trigger signal from the touch sensor 152, and performs the foregoing S12-1 and S12-2 based on the second trigger signal. Then the user wears the first headphone 100 on the ear, and the in-ear detection sensor 151 detects that the in-ear portion 181 enters the ear canal of the user, and sends the third trigger signal. The processor 120 receives the third trigger signal from the in-ear detection sensor 151, and performs the foregoing S12-3 based on the third trigger signal.

Alternatively, when the user needs to use wireless headphone set, the user inputs the preset touch operation on the touch sensor 152 of the connection portion 183 of the first headphone 100, and the touch sensor 152 detects the preset touch operation and sends the second trigger signal. The processor 120 receives the second trigger signal from the touch sensor 152, and performs the foregoing S12-1 based on the second trigger signal. Then the user wears the first headphone 100 on the ear, and the in-ear detection sensor 151 detects that the in-ear portion 181 enters the ear canal of the user, and sends the third trigger signal. The processor 120 receives the third trigger signal from the in-ear detection sensor 151, and performs the foregoing S12-2 and S12-3 based on the third trigger signal.

In some exemplary embodiments, the target trigger signal includes the first trigger signal, the second trigger signal, and the third trigger signal. When the user needs to use the wireless headphone set, the first headphone 100 is taken out of the headphone case, and the out-of-case detection sensor 153 sends the first trigger signal upon detecting that the charging portion 182 is disconnected from the headphone case. The processor 120 receives the first trigger signal from the out-of-case detection sensor 153, and performs the foregoing S12-1 based on the first trigger signal. Then the user inputs the preset touch operation on the touch sensor 152 of the first headphone 100, and the touch sensor 152 detects the preset touch operation, and sends the second trigger signal. The processor 120 receives the second trigger signal from the touch sensor 152, and performs the foregoing S12-2 based on the second trigger signal. Then the user wears the first headphone 100 on the ear, and the in-ear detection sensor 151 detects that the in-ear portion 181 enters the ear canal of the user, and sends the third trigger signal. The processor 120 receives the third trigger signal from the in-ear detection sensor 151, and performs the foregoing S12-3 based on the third trigger signal.

In view of the above, in the entire process of using the wireless headphone, the user only needs to perform two or three of the following operations: (1) take out the first headphone 100 from the headphone case; (2) input the preset touch operation on the touch sensor 152; (3) wear the first headphone 100 on the ear, in order to trigger the processing steps of the foregoing S12-1 to S12-3. In the entire process of using the wireless headphone, a headphone holder is not required, so that operation steps of the user are simplified, and user experience is improved. In addition, a button does not need to be disposed on the headphone case, thereby reducing complexity of a hardware structure of the headphone case. Furthermore, because a control process of the wireless headphone set is no longer dependent on the headphone case, the control process is simplified, and a success rate and stability of a pairing connection of the wireless headphone set can be improved. Further, in the foregoing examples, when the third trigger signal is separately used to trigger the processing step of S12-3, after the first headphone 100 establishes the second pairing connection with the target device 20 and receives the audio data, the audio is not immediately played by the speaker component 160. Instead, after the third trigger signal is received (that is, it is detected that the user wears the first headphone 100), the audio data is converted into the audio and the audio is played by the speaker component 160. In this way, power consumption of the first headphone 100 can be reduced to save power, and audio leakage in an unworn state can be avoided.

In some exemplary embodiments, in the foregoing S12-2, the control module may first control the wireless headphone set 10 to enter a pairing state, and after the wireless headphone set 10 enters the pairing state, instruct the wireless module 130 to pair with the target device 20. The pairing state is a state that the wireless headphone set can be searched and connected by the target device 20. In the pairing state, the wireless headphone set 10 may broadcast a preset signal, so that the target device 20 can search for and connect to the wireless headphone set 10. In the binaural mode, because both the first headphone 100 and the second headphone 200 in the wireless headphone set 10 need to be paired with the target device 20, both the first headphone 100 and the second headphone 200 need to enter the pairing state. In some exemplary embodiments, controlling the wireless headphone set 10 to enter a pairing state may include controlling both the first headphone 100 and the second headphone 200 to enter the pairing state.

In some exemplary embodiments, the control module may control both the first headphone 100 and the second headphone 200 to enter the pairing state, and after determining that both the first headphone 100 and the second headphone 200 enter the pairing state, instruct the wireless module 130 to pair with the target device 20 and establish the second pairing connection. In some exemplary embodiments, after the control module determines that both the first headphone 100 and the second headphone 200 enter the pairing state, the control module instructs the wireless module 130 to broadcast a preset signal, so that the target device 20 can receive the foregoing preset signal and search for the first headphone 100 based on the received preset signal. Because the second headphone 200 also enters the pairing state, the second headphone 200 also broadcasts a preset signal, so that the target device 20 can receive the foregoing preset signal and search for the second headphone 200 based on the received preset signal. Further, the first headphone 100 is paired with the target device 20 and establishes the second pairing connection. In some exemplary embodiments, after finding the first headphone 100, the target device 20 sends a pairing request to the first headphone 100. After the first headphone 100 receives the pairing request, the control module instructs the wireless module 130 to pair with the target device 20 and establish the second pairing connection with the target device 20 after the pairing is completed. Correspondingly, the second headphone 200 is paired with the target device 20 in a similar manner, and a difference lies in that the second headphone 200 does not need to establish the second pairing connection with the target device 20.

In some exemplary embodiments, the control module may pair with the target device 20 in the following manner: controlling the first headphone 100 to enter the pairing state, and sending a second indication signal to the second headphone 200, to instruct the second headphone to enter the pairing state. For example, the control module first controls the first headphone 100 to enter the pairing state, and after determining that the first headphone 100 has entered the pairing state, instructs the wireless module 130 to send the second indication signal to the second headphone 200 through the first pairing connection, where the second indication signal is used to instruct the second headphone 200 to enter the pairing state. After receiving the second indication signal, the second headphone 200 controls the second headphone 200 to enter the pairing state based on the second indication signal. The second headphone 200 sends a notification signal to the first headphone 100, where the notification signal is used to indicate whether the second headphone 200 enters the pairing state. The first headphone 100 receives the notification signal sent by the second headphone 200, and may learn, based on the notification signal, whether the second headphone 200 enters the pairing state. If the first headphone 100 determines, based on the notification signal, that the second headphone 200 enters the pairing state, the wireless module 130 is instructed to pair with the target device 20. If the first headphone 100 determines, based on the notification signal, that the second headphone 200 does not enter the pairing state, the first headphone 100 may repeatedly send the second indication signal to the second headphone 200.

In some exemplary embodiments, the control module may pair with the target device 20 in the following manner: the control module sends a second indication signal to the second headphone, for example, the control module instructs the wireless module 130 to send the second indication signal to the second headphone 200 via the first pairing connection, where the second indication signal is used to instruct the second headphone to enter the pairing state. After receiving the second indication signal, the second headphone 200 is controlled to enter the pairing state based on the second indication signal. The second headphone 200 sends a notification signal to the first headphone 100, where the notification signal is used to indicate whether the second headphone 200 enters the pairing state. The first headphone 100 receives the notification signal sent by the second headphone 200, and may learn, based on the notification signal, whether the second headphone 200 enters the pairing state. If the first headphone 100 determines, based on the notification signal, that the second headphone 200 has entered the pairing state, the control module controls the first headphone 100 to enter the pairing state, and instructs the wireless module 130 to pair with the target device. If the first headphone 100 determines, based on the notification signal, that the second headphone 200 does not enter the pairing state, the first headphone 200 may repeatedly send the second indication signal to the second headphone 200.

In the foregoing embodiment, because the first headphone 100 performs a pairing procedure with the target device 20 only after it is determined that both the first headphone 100 and the second headphone 200 enter the pairing state, a success rate of establishing the second pairing connection in the binaural mode is improved.

In some exemplary embodiments, the wireless module 130 may include a first wireless module and a second wireless module. The first wireless module is configured to establish the first pairing connection with the second headphone 200. That is, the first wireless module may be used for communication between the first headphone 100 and the second headphone 200. The second wireless module is configured to establish the second pairing connection with the target device 20. That is, the second wireless module may be used for communication between the first headphone 100 and the target device 20.

Figure 5:
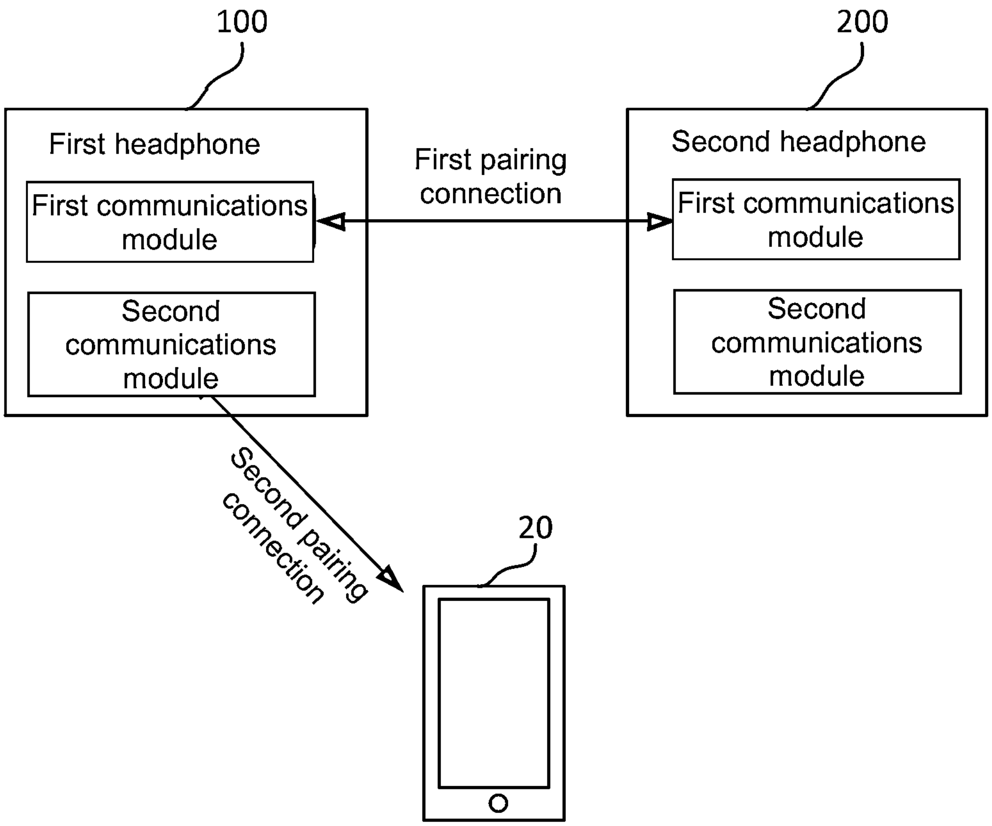
FIG. 5 is a schematic diagram of a pairing connection in a binaural mode according to some exemplary embodiments of this disclosure.

FIG. 5 is a schematic diagram of a pairing connection in a binaural mode according to some exemplary embodiments of this disclosure. As shown in FIG. 5, in the binaural mode, the first wireless module in the first headphone 100 establishes the first pairing connection with a first wireless module in the second headphone 200, and the second wireless module in the first headphone 200 establishes the second pairing connection with the target device 20. The second pairing connection does not need to be established between a second wireless module in the second headphone 200 and the target device 20. That is, the first headphone 100 is used as a primary headphone, and the second headphone 200 is used as a secondary headphone. During audio data transmission, the first headphone 100 receives the audio data from the target device 20 via the second pairing connection, and sends the audio data to the second headphone 200 via the first pairing connection. Both the first headphone 100 and the second headphone 200 convert the audio data into the audio by using the speaker component 160 thereof and play the audio, to achieve a stereo effect.

With reference to FIG. 5, the first headphone 100 is provided with the first wireless module and the second wireless module. Therefore, the first headphone 100 may separately communicate with the second headphone 200 and the target device 20 by using different wireless modules, so that two types of communication (communication with the second headphone 200 and communication with the target device 20) can be decoupled and isolated, thereby avoiding interaction between the two types of communication and improving stability of wireless communication.

In the binaural mode, the second wireless module may be faulty, so that data interaction cannot be performed between the first headphone 100 and the target device 20. In some exemplary embodiments, the second wireless module in the first headphone 100 and the second wireless module in the second headphone 200 may form a redundant backup relationship. If the second wireless module in the first headphone 100 is faulty, the second wireless module in the second headphone 200 may communicate with the target device 20. Specifically, the processor 120 in the first headphone 100 reads the at least one set of instructions, and further performs the following steps according to the instruction of the at least one set of instructions:

S13. Determine that the second wireless module in the first headphone is faulty.

The processor 120 may monitor a running state of the second wireless module in real time or periodically, so that when the second wireless module is faulty, it can be detected in time that the second wireless module is faulty.

S14. Send a first indication signal to the second headphone by using the first wireless module in the first headphone, to instruct the second headphone to establish the second pairing connection with the target device to receive the audio data.

S15. Receive, by using the first wireless module in the first headphone, the audio data sent by the second headphone.

If the control module determines that the second wireless module in the first headphone is faulty, the control module may instruct the first wireless module in the first headphone to send the first indication information to the second headphone 200, to instruct the second wireless module in the second headphone 200 to establish a new second pairing connection with the target device 20. In this way, switching between primary and secondary headphones is implemented, that is, the second headphone 200 becomes a primary headphone, and the first headphone 100 becomes a secondary headphone. The second headphone 200 receives the audio data from the target device 20 via the second pairing connection, and forwards the audio data to the first headphone 100 via the first pairing connection.

Figure 6:
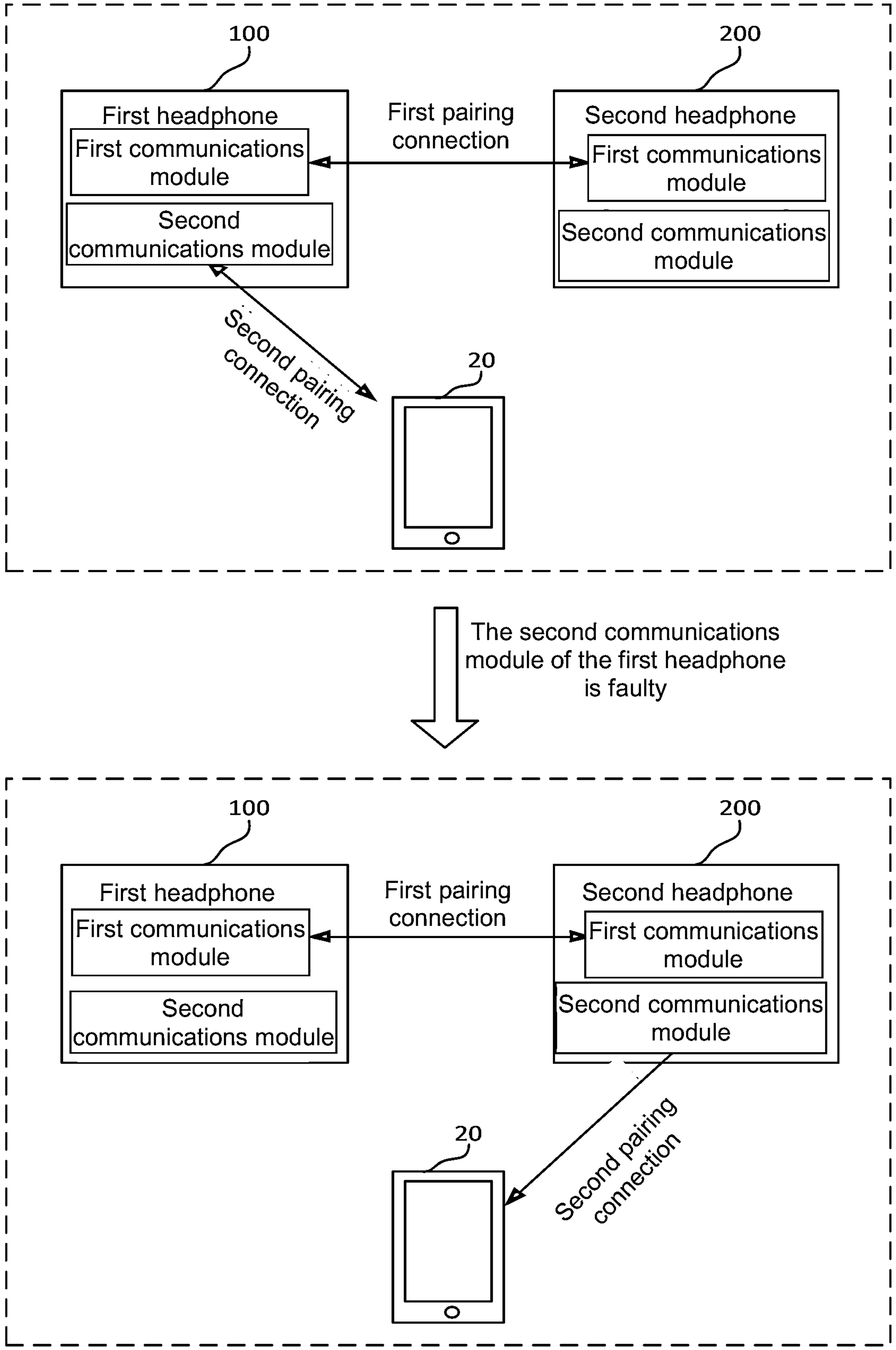
FIG. 6 is a schematic diagram of a change of a pairing connection headphone that a second wireless module in a first headphone is faulty according to some exemplary embodiments of this disclosure.

FIG. 6 is a schematic diagram of a change of a pairing connection in a case that a second wireless module in a first headphone is faulty according to some exemplary embodiments of this disclosure. As shown in FIG. 6, if the second wireless module in the first headphone 100 is faulty, the second wireless module in the second headphone 200 may establish a new second pairing connection with the target device 20. In this case, the second headphone 200 is used as a primary headphone, and the first headphone 100 is used as a secondary headphone. The second headphone 200 may receive the audio data from the target device 20 via the new second pairing connection, and forward the audio data to the first headphone 100 via the first pairing connection. Further, both the first headphone 100 and the second headphone 200 convert the audio data into the audio by using the speaker component 160 thereof and play the audio, to achieve a stereo effect.

In view of the above, even if the second wireless module in the first headphone 100 is faulty, according to the headphone set disclosed in this disclosure, the wireless headphone set 10 can still operate in the binaural mode, thereby improving operating stability of the wireless headphone set 10.

Figure 7:
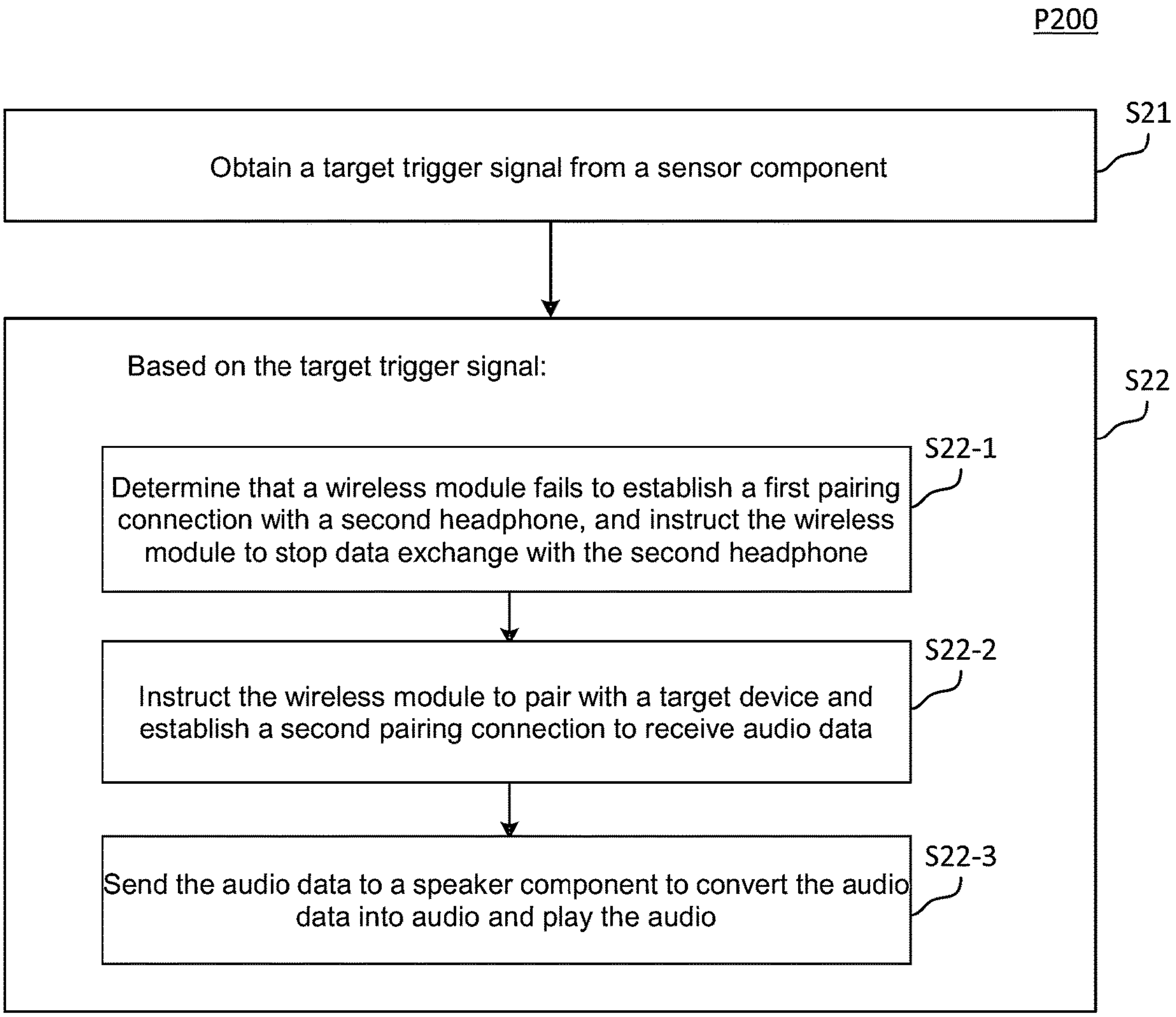
FIG. 7 is a schematic flowchart of a control method for a wireless headphone set in a monaural mode according to some exemplary embodiments of this disclosure.

FIG. 7 is a schematic flowchart of a control method for a wireless headphone set in a monaural mode according to some exemplary embodiments of this disclosure. The first headphone 100 may perform a control method P200 for a wireless headphone set in this disclosure. Specifically, the control module in the first headphone 100 may perform the control method P200 for a wireless headphone set in this disclosure. For example, the processor 120 in the first headphone 100 may read a set of instructions stored in a local storage medium, and then perform the control method P200 for a wireless headphone set described in this disclosure according to an instruction(s) of the set of instructions. As shown in FIG. 4, the method P200 may include the following steps:

S21. Receive a target trigger signal from a sensor component.

It should be understood that a specific implementation of S21 is similar to that in the foregoing S11, and details are not described herein again.

S22. Perform the following S22-1 to S22-3 based on a target trigger signal.

S22-1. Determine that a wireless module fails to establish a first pairing connection with a second headphone, and instruct the wireless module to stop data exchange with the second headphone.

After receiving the target trigger signal, the control module may instruct, based on the target trigger signal, the wireless module 130 to establish the first pairing connection with the second headphone. If the wireless module 130 fails to establish the first pairing connection with the second headphone, the wireless headphone set 10 has to work in the monaural mode, that is, the first headphone 100 operates, and the second headphone 200 does not operate. Therefore, in this case, the control module instructs the wireless module to stop data interaction with the second headphone 200. It should be understood that the foregoing data interaction may include interaction of audio data. For example, after receiving the audio data from the target device 20, the first headphone 100 does not need to forward the audio data to the second headphone 200. The foregoing data interaction may further include interaction of other data. For example, the first headphone 100 no longer sends data such as a control signal, an indication signal, and a notification signal to the second headphone 200.

S22-2. Instruct the wireless module to pair with the target device and establish a second pairing connection to receive the audio data.

In the monaural mode, only the first headphone 100 needs to pair with the target device 20 and establish the second pairing connection. In some exemplary embodiments, the control module may control the first headphone 100 to enter a pairing state. After the first headphone 100 enters the pairing state, the control module instructs the wireless module 130 to pair with the target device 200 and establish the second pairing connection. In some exemplary embodiments, after the first headphone 100 enters the pairing state, the control module instructs the wireless module 130 to broadcast a preset signal, so that the target device 20 can receive the foregoing preset signal and search for the first headphone 100 based on the received preset signal. Further, the first headphone 100 is paired with the target device 20 and establishes the second pairing connection. In some exemplary embodiments, after finding the first headphone 100, the target device 20 sends a pairing request to the first headphone 100. After the first headphone 100 receives the pairing request, the control module instructs the wireless module 130 to pair with the target device 20 and establish the second pairing connection with the target device 20 after the pairing is completed.

S22-3. Send audio data to a speaker component to convert the audio data into an audio and play the audio.

Specifically, the control module may send the audio data to the speaker component 160, so that the speaker component 160 converts the audio data into the audio and plays the audio.

Similar to the binaural mode, in some exemplary embodiments, the target trigger signal may include a single signal. The target trigger signal may trigger performing the foregoing S22-1 to S22-3. In some exemplary embodiments, the target trigger signal may include a plurality of trigger signals. In this case, the foregoing S22-1 to S22-3 may be separately triggered by different trigger signals. For specific examples, refer to the related descriptions of the foregoing binaural mode. Details are not described herein again.

It should be noted that the foregoing content uses the first headphone 100 as an example to describe a structure of the first headphone 100 and the control method for a wireless headphone set. In some exemplary embodiments, a structure of the second headphone 200 may be the same as or similar to the structure of the first headphone 100. The control method for a wireless headphone set described above may also be performed by the second headphone 200, and an implementation principle of the second headphone 200 is similar. Details are not described herein again.

The following describes a working process of the wireless headphone set 10 with reference to a specific example.

When a user needs to use the wireless headphone set 10, the first headphone 100 and the second headphone 200 are taken out of the headphone case. The first headphone 100 and the second headphone 200 may be taken out simultaneously, or may be taken out successively. In an example in which the first headphone 100 is first taken out, the out-of-case detection sensor 153 in the first headphone 100 detects that the charging portion 182 is disconnected from the headphone case, and sends the first trigger signal. The processor 120 of the first headphone 100 receives the first trigger signal from the out-of-case detection sensor 153, and instructs, based on the first trigger signal, the wireless module 130 to establish the first pairing connection with the second headphone 200. In some exemplary embodiments, the first pairing connection between the first headphone 100 and the second headphone 200 may fail to be established. For example, when the second headphone 200 is faulty, the second headphone 200 is out of power, or the second headphone 200 is powered off, the first headphone 100 fails to establish the first pairing connection with the second headphone 200.

Similarly, when the user takes out the second headphone 200, the out-of-case detection sensor 153 in the second headphone 200 detects that the charging portion 182 is disconnected from the headphone case, and sends the first trigger signal. The processor 120 of the second headphone 200 receives the first trigger signal from the out-of-case detection sensor 153, and instructs, based on the first trigger signal, the wireless module 130 to establish the first pairing connection with the first headphone 100. It should be understood that, because the first headphone 100 establishes the first pairing connection with the second headphone 200 when being taken out of the case, the processor 120 of the second headphone 200 may detect that the first pairing connection is established, and therefore the step of establishing the first pairing connection does not need to be performed.

Then, the user may input the preset touch operation on the touch sensor 152 of the first headphone 100. The touch sensor 152 detects the preset touch operation and sends the second trigger signal. The processor 120 of the first headphone 100 receives the second trigger signal from the touch sensor 152, and determines whether the first pairing connection between the first headphone 100 and the second headphone 200 is normal. If the first pairing connection is normal, it is determined that the wireless headphone set works in the binaural mode. In the binaural mode, the processor 120 of the first headphone 100 controls, based on the second trigger signal, both the first headphone 100 and the second headphone 200 to enter the pairing state, and instructs the wireless module 130 to pair with the target device 20 and establish the second pairing connection, to receive the audio data from the target device 20. The first headphone 100 forwards the received audio data to the second headphone 200. If the first pairing connection is abnormal, that is, the first headphone 100 determines that the first pairing connection cannot be established with the second headphone 200, it is determined that the wireless headphone set works in the monaural mode. In the monaural mode, the processor 120 of the first headphone 100 controls, based on the second trigger signal, the first headphone 100 to enter the pairing state, and instructs the wireless module 130 to pair with the target device 20 and establish the second pairing connection, to receive the audio data from the target device 20.

In some exemplary embodiments, the user may also input the preset touch operation on the touch sensor 152 of the second headphone 200, and the second headphone 200 performs a processing procedure similar to that of the first headphone 100. It should be understood that if the user touches only one headphone, the second pairing connection is established between the headphone touched by the user and the target device 20, that is, the headphone touched by the user is used as a primary headphone, and the other headphone is used as a secondary headphone. In some exemplary embodiments, the user may also touch two headphones at the same time. In this case, the first headphone 100 and the second headphone 200 separately perform the foregoing processing procedure. A headphone that is first paired successfully with the target device 20 is used as a primary headphone, and the other headphone is used as a secondary headphone.

Further, the user wears the first headphone 100 on the ear, and the in-ear detection sensor 151 in the first headphone 100 detects that the in-ear portion 181 enters the ear canal of the user and sends the third trigger signal. The processor 120 of the first headphone 100 receives the third trigger signal from the in-ear detection sensor 151, and plays, based on the third trigger signal, the audio data received from the target device 20, that is, converts the audio data into the audio and plays the audio. Similarly, the user wears the second headphone 200 on the ear, and the in-ear detection sensor 151 in the second headphone 200 detects that the in-ear portion 181 enters the ear canal of the user and sends the third trigger signal. The processor 120 of the second headphone 200 receives the third trigger signal from the in-ear detection sensor 151, and plays, based on the third trigger signal, the audio data forwarded by the first headphone 100. In this way, the user hears stereo audio data by using the first headphone 100 and the second headphone 200.

It view of the above, according to the wireless headphone set and the control method for a wireless headphone set provided in this disclosure, the wireless headphone set includes a first headphone and a second headphone that can be paired, where the first headphone includes: a sensor component, a wireless module, and a speaker component. The sensor component is configured to send a target trigger signal; and based on the target trigger signal, the first headphone establishes a first pairing connection with the second headphone via the wireless module, pairs with a target device and establishes a second pairing connection via the wireless module to receive audio data, and sends the audio data to the second headphone, and plays audio corresponding to the audio data with the speaker component. It can be learned that in the entire process of using the wireless headphone set, a headphone holder is not required, so that operation steps of the user are simplified, and user experience is improved. In addition, a button does not need to be provided on the headphone case, thereby reducing complexity of a hardware structure of the headphone case. Furthermore, because a control process of the wireless headphone set is no longer dependent on the headphone case, the control process is simplified, and a success rate and stability of a pairing connection of the wireless headphone set can be improved. Further, if a second wireless module in the first headphone is faulty, the first headphone may instruct the second headphone to establish the second pairing connection with the target device, to implement switching between a primary headphone and a secondary headphone, without affecting normal operation of a binaural mode of the wireless headphone, thereby further improving operating stability of the wireless headphone set.

Another aspect of this disclosure provides a non-transitory storage medium that stores at least one set of executable instructions for controlling a wireless headphone set. When the executable instruction is executed by a processor, the executable instruction instructs the processor to implement the steps of the control method for a wireless headphone set provided in this disclosure. In some possible implementations, the aspects of this disclosure may further be implemented in a form of a program product, including program code. When the program product runs on the first headphone 100, the program code is used to enable the first headphone 100 to perform the steps of the control method for a wireless headphone set described in this disclosure. A program product for implementing the method according to the embodiments of the present disclosure may be in the form of a portable compact disk read-only memory (CD-ROM) and include program code, and may be run on the first headphone 100, such as a personal computer. However, the program product of the present disclosure is not limited hereto. In the present disclosure, the computer-readable storage medium may be any tangible medium that contains or stores a program, and the program may be used by or in combination with an instruction execution system. The program product may be any combination of one or more readable media. The readable medium may be a readable signal medium or a readable storage medium. The readable storage medium may be, for example, but not limited to, electrical, magnetic, optical, electromagnetic, infrared, or semiconductor systems, apparatuses, or devices, or any combination thereof. More specific examples of the readable storage medium include an electrical connection with one or more conducting wires, a portable computer disk, a hard disk, a random access memory (RAM), a read-only memory (ROM), an erasable programmable ROM (an EPROM or a flash memory), an optical fiber, a portable CD-ROM, an optical storage device, a magnetic storage device, or any suitable combination thereof. The computer-readable storage medium may include a data signal propagated in a baseband or as a part of a carrier, and readable program code is carried therein. The propagated data signal may be in various forms, including but not limited to an electromagnetic signal, an optical signal, or any suitable combination thereof. The computer-readable storage medium may alternatively be any readable medium other than the readable storage medium. The readable medium may send, propagate, or transmit a program to be used by or in combination with the instruction execution system, apparatus, or device. The computer-readable storage medium contained on the readable medium may be transmitted using any suitable medium, including but not limited to: a wireless medium, a wired medium, an optical fiber, an RF, or any suitable combination thereof. Program code for executing the operations in the present disclosure may be compiled by using one or more programming languages or any combination thereof. The programming languages include object oriented programming languages, such as Java and C++, and conventional procedural programming languages, such as C or similar programming languages. The program code can be executed fully on the first headphone 100, executed partially on the first headphone 100, executed as an independent software package, executed partially on the first headphone 100 and partially on a remote computing device, or executed fully on a remote computing device.

The foregoing describes the specific embodiments of the present disclosure. Other embodiments also fall within the scope of the appended claims. In some cases, the actions or steps described in the claims may be performed in sequences different from those in the embodiments and still achieve expected results. In addition, the processes depicted in the accompanying drawings do not necessarily require the specific orders or sequential orders shown for achieving the expected results. In some implementations, multitasking and parallel processing are also possible or may be advantageous.

In summary, after reading this detailed disclosure, a person skilled in the art can understand that the foregoing detailed disclosure is presented by way of example only, and is not limited thereto. Although there is no explicit description, a person skilled in the art can understand that this disclosure intends to cover various changes, improvements and modifications to the embodiments. These changes, improvements and modifications are intended to be included in this disclosure and are within the spirit and scope of the embodiments of this disclosure.

In addition, some specific terms in this disclosure have been used to describe the embodiments of this disclosure. For example, "one embodiment", "an embodiment" and/or "some embodiments" mean that a specific feature, structure, or characteristic described in combination with the embodiment may be included in at least one embodiment of the present disclosure. Therefore, it can be emphasized and should be understood that two or more references to "an embodiment" or "one embodiment" or "an alternative embodiment" in various parts of this disclosure do not necessarily all refer to the same embodiment. In addition, specific feature, structure, or characteristic may be appropriately combined in one or more embodiments of the present disclosure.

It should be understood that in the foregoing description of the embodiments of the present disclosure, to help understand a feature, and for the purpose of simplifying the present disclosure, the present disclosure sometimes combines various features in a single embodiment, a drawing, or description thereof. However, this does not mean that the combination of these features is necessary. It is entirely possible for a person skilled in the art to extract part of the device as a single embodiment for understanding when reading this disclosure. In other words, the embodiments in this disclosure can also be understood as an integration of multiple sub-embodiments. The content of each sub-embodiment is also true when it is less than all the characteristics of a single previously disclosed embodiment.

Each patent, patent application, patent application publication and other materials cited herein, such as articles, books, specifications, publications, documents, articles and the like, may be incorporated herein by reference. The entire content used for all purposes, except for any related litigation document history, may be inconsistent or conflicting with this document, or any identical litigation document that may have restrictive influence on the broadest scope of the claims' history. Those are associated with this document now or in the future. For example, if the description, definition, and/or use of terms in any associated materials contained herein is inconsistent with or in conflict with that in this document, the terms in this document shall prevail.

Finally, it should be understood that the embodiments disclosed herein are for describing the principle of the embodiments of the present disclosure. Other modified embodiments are also within the scope of this disclosure. Therefore, the embodiments disclosed in this disclosure are merely examples rather than limitations. A person skilled in the art can adopt alternative configurations according to the embodiments of the present disclosure to implement the disclosure in the present disclosure. Therefore, the embodiments of the present disclosure are not limited to those explicitly described in the application.

What is claim is:

1. A wireless headphone set, comprising: a first headphone and a second headphone, wherein first headphone is pairable and the second headphone is pairable, and the first headphone includes:

a speaker component, a wireless module, including a first wireless module configured to establish a first pairing connection with the second headphone and a second wireless module configured to establish a second pairing connection with a target device, a sensor component, configured to send a target trigger signal; and a control module in communication with the speaker component, the wireless module and the sensor component, and configured to control the wireless headphone set to receive audio data from the target device in a target mode and play the audio data, wherein the target mode includes a binaural mode, and in the binaural mode, the control module receives the target trigger signal from the sensor component, and based on the target trigger signal:

instruct the first wireless module to establish the first pairing connection with the second headphone, instruct the second wireless module to pair with the target device and establish the second pairing connection to receive the audio data, and send the audio data to the second headphone, determine that the second wireless module is faulty, instruct the first wireless module to send a first indication signal to the second headphone to instruct the second headphone to establish the second pairing connection with the target device so as to receive the audio data, instruct the first wireless module to receive the audio data sent by the second headphone, and send the audio data to the speaker component to convert the audio data into an audio.

2. The wireless headphone set according to claim 1, wherein the target trigger signal includes at least one of:

a first trigger signal, triggered by the sensor component following detecting that the first headphone enters an out-of-case state;

a second trigger signal, triggered by the sensor component following detecting a preset touch operation; or a third trigger signal, triggered by the sensor component following detecting that the first headphone enters a wearing state.

3. The wireless headphone set according to claim 2, wherein the target trigger signal includes the first trigger signal, the second trigger signal, and the third trigger signal; and in response to the target trigger signal, the control module performs:

receiving the first trigger signal from the sensor component, and instructing, based on the first trigger signal, the first wireless module to establish the first pairing connection with the second headphone, receiving the second trigger signal from the sensor component, instructing, based on the second trigger signal, the second wireless module to pair with the target device and establish the second pairing connection to receive the audio data, and sending the audio data to the second headphone, and receiving the third trigger signal from the sensor component, and sending the audio data to the speaker component based on the third trigger signal to convert the audio data into the audio.

4. The wireless headphone set according to claim 2, wherein the target trigger signal includes the second trigger signal and the third trigger signal; and in response to the target trigger signal, the control module performs:

receiving the second trigger signal from the sensor component, and based on the second trigger signal, instructing the first wireless module to establish the first pairing connection with the second headphone, instructing the second wireless module to pair with the target device and establish the second pairing connection to receive the audio data, and sending the audio data to the second headphone, and receiving the third trigger signal from the sensor component, and sending the audio data to the speaker component based on the third trigger signal to convert the audio data into the audio.

5. The wireless headphone set according to claim 2, wherein a body of the first headphone includes:

a charging portion in contact with a headphone case during charging, an in-ear portion configured to enter an ear canal of a user during wearing, and a connection portion connected with the charging portion and the in-ear portion; and the sensor component includes at least one of the following sensors:

an out-of-case detection sensor, disposed in the charging portion and configured to send the first trigger signal upon detecting that the charging portion is disconnected from the headphone case, a touch sensor, disposed in the connection portion and configured to send the second trigger signal when upon detecting a preset touch operation of the user, and an in-ear detection sensor, disposed in the in-ear portion and configured to send the third trigger signal upon detecting that the in-ear portion enters the ear canal of the user.

6. The wireless headphone set according to claim 1, wherein to instruct the second wireless module to pair with the target device, the control module performs:

controlling the first headphone to enter a pairing state;

sending a second indication signal to the second headphone to instruct the second headphone to enter the pairing state;

receiving a notification signal sent by the second headphone, and determining, based on the notification signal, that the second headphone has entered the pairing state; and instructing the second wireless module to pair with the target device.

7. The wireless headphone set according to claim 1, wherein to instruct the second wireless module to pair with the target device, the control module performs:

sending a second indication signal to the second headphone to instruct the second headphone to enter a pairing state;

receiving a notification signal sent by the second headphone, and determining, based on the notification signal, that the second headphone has entered the pairing state;

controlling the first headphone to enter the pairing state; and instructing the second wireless module to pair with the target device.

8. The wireless headphone set according to claim 1, wherein the target mode further includes a monaural mode; and in the monaural mode, the control module performs:

receiving the target trigger signal from the sensor component, and based on the target trigger signal:

determining that the first wireless module fails to establish the first pairing connection with the second headphone, and instructing the first wireless module to stop data exchange with the second headphone, instructing the second wireless module to pair with the target device and establish the second pairing connection to receive the audio data, and sending the audio data to the speaker component to convert the audio data into the audio.

9. A control method for a wireless headphone set, wherein the wireless headphone set includes a first headphone and a second headphone, the first headphone is pairable, the second headphone is pairable, the first headphone includes a speaker component, a wireless module including a first wireless module and a second wireless module, a sensor component, and a control module, a working mode of the wireless headphone set includes a binaural mode, and the method is applicable to the first headphone, and in the binaural mode, the method comprises: by the control module, receiving a target trigger signal from the sensor component; and based on the target trigger signal, instructing the first wireless module to establish a first pairing connection with the second headphone, instructing the second wireless module to pair with a target device and establish a second pairing connection to receive audio data, and sending the audio data to the second headphone, determining that the second wireless module is faulty, instructing the first wireless module to send a first indication signal to the second headphone to instruct the second headphone to establish the second pairing connection with the target device so as to receive the audio data, instructing the first wireless module to receive the audio data sent by the second headphone, and sending the audio data to the speaker component to convert the audio data into an audio.

10. The method according to claim 9, wherein the target trigger signal includes at least one of:

a first trigger signal, triggered by the sensor component following detecting that the first headphone enters an out-of-case state;

a second trigger signal, triggered by the sensor component following detecting a preset touch operation; or a third trigger signal, triggered by the sensor component following detecting that the first headphone enters a wearing state.

11. The method according to claim 10, wherein the target trigger signal includes the first trigger signal, the second trigger signal, and the third trigger signal; and based on the target trigger signal, instructing the first wireless module to establish the first pairing connection with the second headphone, and instructing the second wireless module to pair with the target device and establish the second pairing connection to receive the audio data, and sending the audio data to the second headphone, and the sending of the audio data to the speaker component to convert the audio data into the audio includes:

instructing, based on the first trigger signal, the first wireless module to establish the first pairing connection with the second headphone, based on the second trigger signal, instructing the second wireless module to pair with the target device and establish the second pairing connection to receive the audio data, and sending the audio data to the second headphone, and sending the audio data to the speaker component based on the third trigger signal to convert the audio data into the audio.

12. The method according to claim 10, wherein the target trigger signal includes the second trigger signal and the third trigger signal; and based on the target trigger signal, instructing the first wireless module to establish the first pairing connection with the second headphone, and instructing the second wireless module to pair with the target device and establish the second pairing connection to receive the audio data, and sending the audio data to the second headphone, and the sending of the audio data to the speaker component to convert the audio data into the audio includes:

based on the second trigger signal, instructing the first wireless module to establish the first pairing connection with the second headphone, instructing the second wireless module to pair with the target device and establish the second pairing connection to receive the audio data, and sending the audio data to the second headphone, and sending the audio data to the speaker component based on the third trigger signal to convert the audio data into the audio.

13. The method according to claim 10, wherein the receiving of the target trigger signal from the sensor component includes at least one of:

receiving the first trigger signal from an out-of-case detection sensor, wherein the out-of-case detection sensor is configured to send the first trigger signal upon detecting that a charging portion of the first headphone is disconnected from an headphone case;

receiving the second trigger signal from a touch sensor, wherein the touch sensor is configured to send the second trigger signal upon detecting a preset touch operation performed by a user on the touch sensor; or receiving the third trigger signal from an in-ear detection sensor, wherein the in-ear detection sensor is configured to send the third trigger signal upon detecting that an in-ear portion of the first headphone enters an ear canal of the user.

14. The method according to claim 9, wherein the instructing of the second wireless module to pair with the target device includes:

controlling the first headphone to enter a pairing state;

sending a second indication signal to the second headphone, to instruct the second headphone to enter a pairing state;

receiving a notification signal sent by the second headphone, and determining, based on the notification signal, that the second headphone has entered the pairing state; and instructing the second wireless module to pair with the target device.

15. The method according to claim 9, wherein the instructing of the second wireless module to pair with a target device includes:

sending a second indication signal to the second headphone, to instruct the second headphone to enter a pairing state;

receiving a notification signal sent by the second headphone, and determining, based on the notification signal, that the second headphone has entered the pairing state;

controlling the first headphone to enter the pairing state; and instructing the second wireless module to pair with the target device.

16. The method according to claim 9, wherein the working mode of the wireless headphone set further includes a monaural mode, and in the monaural mode, the method further comprises: by the control module:

receiving a target trigger signal from the sensor component; and based on the target trigger signal, determining that the first wireless module fails to establish the first pairing connection with the second headphone, and instructing the first wireless module to stop data exchange with the second headphone, instructing the second wireless module to pair with the target device and establish the second pairing connection to receive the audio data, and sending the audio data to the speaker component to convert the audio data into the audio.

* * * * *